(12) United States Patent  
Ishida (10) Patent No.: US 7,206,086 B2  
(45) Date of Patent: Apr. 17, 2007

(54) PRINTING SYSTEM WITH MEANS FOR CORRECTING ORDER INFORMATION

(75) Inventor: Hironobu Ishida, Kaisei-machi (JP)

(73) Assignee: Fuji Photo Film., Co. Ltd., Kanagawa-Ken (JP)

(*) Notice: Subject to any disclaimer, the term of this patent is extended or adjusted under 35 U.S.C. 154(b) by 1004 days.

(21) Appl. No.: 09/773,618

(22) Filed: Feb. 2, 2001

(65) Prior Publication Data

US 2001/0017711 A1 Aug. 30, 2001

(30) Foreign Application Priority Data

Feb. 4, 2000 (JP) ............................. 2000/027963
Dec. 27, 2000 (JP) ............................. 2000/398311

(51) Int. Cl.
*G06F 3/02* (2006.01)
*G06K 15/00* (2006.01)

(52) U.S. Cl. ..................................... 358/1.15; 358/1.14
(58) Field of Classification Search ......... 358/1.1–1.18
See application file for complete search history.

(56) References Cited

U.S. PATENT DOCUMENTS 6,775,023 B1 * 8/2004 Fukunaga et al. ......... 358/1.15

FOREIGN PATENT DOCUMENTS

JP 09101614 4/1997

* cited by examiner

*Primary Examiner*—Douglas Q. Tran
(74) *Attorney, Agent, or Firm*—Birch, Stewart, Kolasch & Birch, LLP (57) ABSTRACT

A problem of disagreement between an actual quantity of prints and a quantity described in order information is solved. The order information transferred from an orderer is stored in a database of an order reception site and in a database of a laboratory. An operator compares the actual quantity with the quantity specified in the order information. If the two quantities do not agree, an instruction to change the order information is input. A correction affirmation system receives this instruction and generates correction affirmation information. The correction affirmation system changes the order information stored in the database in the laboratory and affirms the content thereof. The correction affirmation system then transfers the correction affirmation information to the order reception site. A correction affirmation system in the order reception site changes the order information in the database thereof based on the correction affirmation information, and affirms the content thereof.

27 Claims, 9 Drawing Sheets

| | |
|---|---|
| FILE NAME | : File 001.jpg |
| REQUESTED QUANTITY | : 3 |
| PRINT SIZE | : L |
| GLOSSY OR NON-GLOSSY | : GLOSSY |

2

| | |
|---|---|
| FILE NAME | : File 003.jpg |
| REQUESTED QUANTITY | : 1 |
| PRINT SIZE | : L |
| GLOSSY OR NON-GLOSSY | : GLOSSY |

．
．
．

| | |
|---|---|
| RECEPTION METHOD | : BY MAIL |
| TOTAL REQUESTED QUANTITY | : 24 |

| ORDER NUMBER | AGENCY CODE | RECEPTION NUMBER | DATE OF ORDER | QUANTITY | NUMBER | PROCESSING DATE | STATUS |
|---|---|---|---|---|---|---|---|
| N00101 | 1209987 | 99560 | 1999/10/13 | 25 | 7 | 1999/10/15 | PROCESSED |
| N00102 | 1209987 | 99561 | 1999/10/13 | 7 | 5 | 1999/10/15 | PROCESSED |
| N00103 | 3456789 | 9001 | 1999/10/14 | 40 | 30 | 1999/10/15 | CANCELD |

Buttons: UNPROCESSED ORDER DISPLAY (B1), ORDER CANCELLATION (B2), ORDER ITEM CANCELLATION (B3), PAPER LIST RE-OUTPUT (B4), SELECT-ALL/CANCEL-ALL (B5), ORDER WRITING (B6), REPRINT (B7), CLOSE (B8)

DISPLAY FOR PAST 20 DAYS

AFFILIATE SELECTION: 3 FDINET ▶

SORTING ORDER SELECTION: ● ORDER NUMBER  ○ AGENCY CODE

ORDER NUMBER N00101  RECEPTION NUMBER 99560
AGENCY CODE 1209987  QUANTITY 25  USER NAME TARO FUJI  PHONE NUMBER 03-3456-7890
AFFILIATE FDINET NUMBER 7  USER ADDRESS SHIBUYA-KU, TOKYO ◯◯◯

<BACK  NEXT>  CANCEL  CANCELLATION CONDITION RECORDING

1. File 001.jpg  SIZE DSC  QUANTITY 4  CORRECTION ☐  CANCELLATION ☐
2. File 002.jpg  SIZE L  QUANTITY 3  CORRECTION ☐  CANCELLATION ☐
3. File 002.jpg  SIZE L  QUANTITY 6  CORRECTION ☐  CANCELLATION ☐
4. File 004.jpg  SIZE DSC  QUANTITY 2  CORRECTION ☐  CANCELLATION ☐
5. File 005.jpg  SIZE DSC  QUANTITY 4  CORRECTION ☐  CANCELLATION ☐
6. File 006.jpg  SIZE L  QUANTITY 2  CORRECTION ☐  CANCELLATION ☐

FIG.6

| | B13 | B14 | B15 |
|---|---|---|---|
| | SHEET REISSUE | RELECT-ALL/ CANCEL-ALL | AFFIRM |

| ORDER NUMBER | RECEPTION NUMBER | PROCESSING DATE | STATUS |
|---|---|---|---|
| ☑N00101 | 99560 | 1999/10/13 | NOT AFFIRMED |
| ☑N00102 | 99561 | 1999/10/13 | NOT AFFIRMED |
| ☐N00103 | 9001 | 1999/10/13 | NOT AFFIRMED |
| ☐N00104 | 9002 | 1999/10/13 | NOT AFFIRMED |
| ☐N00105 | 9003 | 1999/10/14 | NOT AFFIRMED |

PRINTING SYSTEM WITH MEANS FOR CORRECTING ORDER INFORMATION

BACKGROUND OF THE INVENTION

1. Field of the Invention

The present invention relates to a printing system for generating a print based on order information requesting printing of an image.

2. Description of the Related Art

Digital photographic service systems for carrying out digital photographic services such as printing users' digital image data obtained by photographing with digital cameras, and providing the digital image data to users by recording the data in CD-Rs have been known. As one form of such systems, a network photographic service system for printing image data of users by transferring the image data and order information describing a requested quantity of prints and the like to a printing order server via a network such as the Internet has also been proposed.

In such a network photographic service system, in order to provide digital photographic services to users, printing of image data and delivery of prints are carried out in collaboration with an order reception agency for receiving orders from the users, an order reception site for receiving the orders from the agency, an order reception center for relaying the orders from the order reception site, and a laboratory for generating prints. More specifically, in the case of a system comprising order reception agencies, order reception sites, an order reception center, and print generation laboratories, each of the order reception agencies receives image data and order information from a plurality of users and each of the order reception sites receives the image data and the order information from the order reception agencies. The order reception center receives the image data and the order information from the order reception sites. The content of the order information ranges widely from a print size to trimming specification. Therefore, some of the print generation laboratories cannot deal with the order information in some cases. Consequently, the order reception center transfers the image data and the order information to one of the laboratories that can process the order, based on the content of the order information. In this manner, the print generation laboratory carries out printing based on the content of the order information. The order information also describes where and how the prints are received. By this information, a user can receive the prints at a desired place (such as an agency) or by a desired method (such as mailing). Other forms of network photographic service systems, such as a system in which users directly place an order with an order reception center and a system in which an order reception site directly transfers image data and order information to a print generation laboratory without involving an order reception center, have also been proposed.

The prints generated by the laboratory are checked by an operator of the laboratory for their quality and quantity, and provided to the user or an agency specified by the user. However, printing is not carried out or the prints are not provided to the user in the case where the image data whose printing is requested have been damaged or represent a faulty image such as an entirely black or white image or an ethically questionable image. Therefore, the actual quantity of prints provided to the user is different from the requested quantity specified in the order information. Consequently, the exact quantity of the prints cannot be understood by simply referring to the order information. Especially, in the case where a bill is issued to the user or to the agency, the bill charges more than for the actual prints if the order information is simply referred to.

Therefore, the operator in the laboratory conventionally prints the order information at the time of examining the prints and corrects the quantity by manually checking the images that have not been printed. This checking result is then sent to a system issuing the bill or to the agency, and the actual quantity is notified. However, using the printed order information for correction of the quantity requires manual correction of the order information in the system issuing the bill or in the agency. As a result, this operation is troublesome and inefficient.

SUMMARY OF THE INVENTION

The present invention has been conceived based on consideration of the above problem. An object of the present invention is therefore to provide a printing system enabling efficient correction of order information.

A printing system of the present invention is a printing system comprising a laboratory server for obtaining prints by carrying out printing of an image based on order information provided from a user for instructing printing of the image. The laboratory server has a laboratory database for storing the order information including information representing at least an image ID for specifying the image to be printed and a requested quantity of the prints of the image, and added with an order ID for identifying the order information. The printing system is characterized in that the laboratory server comprises correction means for changing the requested quantity of the prints in the order information stored in the laboratory database to an actual quantity of the prints.

The order information is provided from the user by being transferred from a personal computer of the user to the laboratory server via a network. Alternatively, the order information may be recorded in a recording medium such as an FD, a CD-R, or an MO disc and brought to the laboratory server.

The laboratory server is installed in a print generation laboratory in a network photographic service system.

In the printing system of the present invention, it is preferable for the correction means to change the requested quantity to the actual quantity based on reception of specification of the order ID and correction of the requested quantity to the actual quantity regarding the image ID included in the specified order ID.

Furthermore, it is preferable for the laboratory server in the printing system of the present invention to further comprise affirmation means for affirming, in the case where the actual quantity of the prints has been affirmed, the content of the order information stored in the laboratory database, based on the order ID including the image ID of the prints whose actual quantity has been affirmed.

"Affirming the content of the order information" refers to adding information indicating the affirmation to a header of the order information or turning on a flag indicating the affirmation, for example.

It is preferable for the printing system of the present invention to further comprise a relay server having a database for storing the order information from the user. The relay server transfers the order information to the laboratory server via the network. It is also preferable in this case for the laboratory server in the printing system to further comprise transmission means for generating correction information related to the order ID added to the order information in order to change the requested quantity in the order information to the actual quantity of the prints and for transmitting the correction information to the relay server in the case where the requested quantity is different from the actual quantity of the prints. It is also preferable in this case for the relay server to comprise correction means for changing the requested quantity in the order information having the order ID related to the correction information out of the order information stored in the database thereof to the actual quantity of the prints, based on the correction information transmitted thereto.

The relay server is installed in a system existing between the user and the print generation laboratory, such as in an order reception agency, an order reception site, or an order reception center in the network photographic service system.

In this case, it is preferable for the transmission means to generate affirmation information indicating affirmation of the actual quantity of the prints related to the order ID added to the order information having the image ID of the prints whose actual quantity has been affirmed and to transmit the affirmation information to the relay server so that the correction means in the relay server can affirm the content of the order information having the order ID related to the affirmation information out of the order information stored in the database, based on the affirmation information transmitted thereto.

In this case, the user provides the order information to the relay server either by transferring the order information via the network or by bringing a recording medium storing the order information to the relay server.

Moreover, in the printing system of the present invention, it is preferable for the laboratory server to further comprise data generating means for generating bill data for generating a bill by referring to the order information stored in the laboratory database.

Especially in the case where the relay server is used, it is preferable for the laboratory server and/or the relay server to further comprise data generating means for generating bill data for generating a bill by referring to the order information stored in the laboratory database and/or the database of the relay server.

In the case where the data generating means is used, it is preferable for the laboratory server and/or the relay server to further comprise a bill issuing system for generating the bill based on the bill data.

It is also preferable for the printing system of the present invention to further comprise a system for issuing a bill by referring to the order information stored in the laboratory database.

Especially in the case where the relay server is used, it is preferable for the printing system of the present invention to further comprise a system for issuing a bill by referring to the order information stored in the laboratory database and/or the database of the relay server.

The bill may be issued to the user or to the agency at which the user receives the prints.

According to the present invention, the order information is stored in the laboratory database of the laboratory server and the requested quantity described in the order information stored in the laboratory database is corrected to the actual quantity of the prints. In this manner, the requested quantity described in the order information agrees with the actual quantity. Therefore, by referring to the laboratory database, the actual quantity can be known easily. As a result, convenience of the agency and the bill issuing system for carrying out processing based on the actual quantity of the prints can be improved, which leads to high efficiency of a printing service.

If the content of the order information is affirmed at the time of affirmation of the actual quantity of the prints, based on the order ID added to the order information including the image ID of the prints whose actual quantity has been affirmed, affirmation of the actual quantity can be known by referring to the order information having the order ID. In this manner, the agency and the bill issuing system can immediately know the affirmed quantity of the prints by referring to the order information.

Furthermore, in the present invention, the relay server may be used and the order information may be stored in the database of the relay server. In this case, when the order information in the laboratory database is changed, the transmission means of the laboratory server generates the correction information related to the order ID and transmits the correction information to the relay server. Based on the correction information, the relay server then changes, to the actual quantity, the requested quantity of the order information having the order ID related to the correction information, out of the order information stored in the database thereof. Therefore, by referring to the database of the relay server, the actual quantity can be known easily. In this manner, convenience for the agency and the bill issuing system can be improved and the efficient printing service can be provided.

Moreover, by transferring the affirmation information indicating affirmation of the quantity to the relay server and by causing the relay server to affirm the content of the order information, affirmation of the quantity can be known by referring to the order information stored in the relay server. In this manner, the agency or the bill issuing system can immediately know the affirmed quantity by referring to the order information.

By generating the bill data for issuing a bill by referring to the order information stored in the laboratory database, or stored in the laboratory database and/or the database of the relay server if the relay server is used, the DPE store or the bill issuing system can issue the bill by referring to the bill data. In this manner, the printing service has improved efficiency.

By using the bill issuing system referring to the order information stored in the laboratory database, or stored in the laboratory database and/or the database of the relay server if the relay server is used, convenience for the agency and the bill issuing system can be improved, and the printing service having high efficiency can be provided.

DESCRIPTION OF THE PREFERRED EMBODIMENTS

Hereinafter, embodiments of the present invention will be explained with reference to the accompanying drawings.

Figure 1:
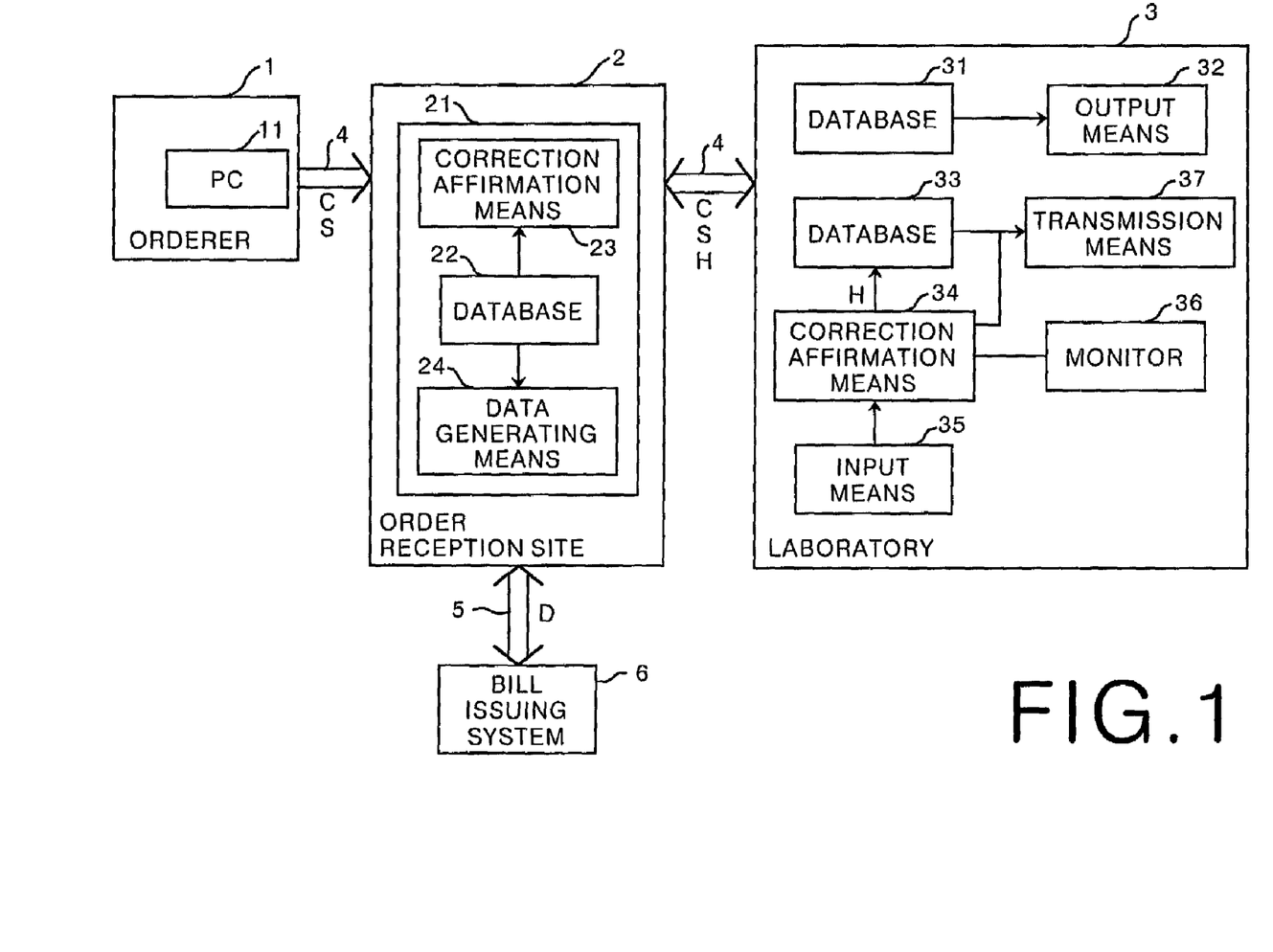
FIG. 1 is a block diagram showing a configuration of a printing system as an embodiment of the present invention.

FIG. 1 is a block diagram showing a configuration of a printing system according to an embodiment of the present invention. As shown in FIG. 1, the printing system in this embodiment comprises orderers 1, order reception sites 2, and print generation laboratories 3 connected to each other by a network 4. In FIG. 1, only each one of the orderers 1, the order reception sites 2 (hereinafter respectively called the orderer 1 and the order reception site 2), and the laboratories 3 is shown for simplicity's sake. However, each of the order reception sites 2 is connected to the orderers 1 and each of the laboratories 3 is connected to the order reception sites 2.

Figure 2:
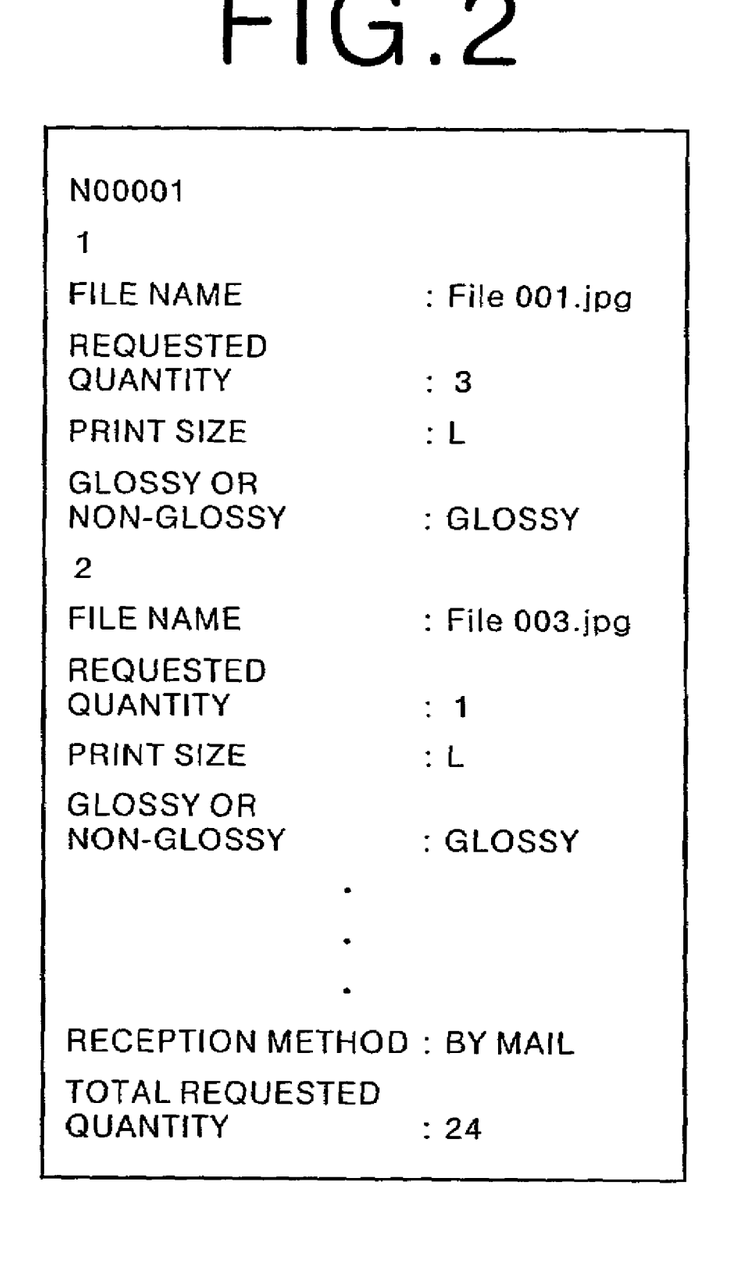
FIG. 2 shows the content of order information.

The orderer 1 may be a user or an order reception agency receiving orders from the user. In this embodiment, the orderer 1 is an order reception agency. The orderer 1 has a personal computer 11 as an order server, and can exchange data with each of the order reception sites 2 and the laboratories 3 via the network 4. The orderer 1 receives order information C generated by a user and image data S, and transfers the order information C and the image data S to the order reception site 2. FIG. 2 shows the content of an item of the order information C. As shown in FIG. 2, each item of the order information C has an order ID specifying the item of the order information C (shown as N00001 here), and includes image IDs comprising serial numbers such as 1, 2, 3. For each of the image IDs, a file name of an image whose printing is requested, a requested quantity, a print size, and preference of glossy or non-glossy printing paper are also described therein, for example. In a last line shown in FIG. 2, a total requested quantity is described. In a line immediately above the last line, a method of receiving prints is also described.

The order reception site 2 has a printing order reception system 21 connected to the personal computer 11 of the orderer 1 via the network 4. The order reception site 2 receives the item of the order information C from the orderer 1, and assigns one of the laboratories 3 to carry out printing (hereinafter called the laboratory 3), based on the content of the item of the order information C.

For this assignment, the laboratory 3 is selected according to a criterion such as a laboratory located close to the user requesting the prints, or a laboratory that can carry out processing requested by the user, for example. The printing order reception system 21 comprises a database 22 for storing the item of the order information C, and the item of the order information C transferred from the personal computer 11 is stored in this database 22 so as to be identified by the order ID.

The printing order reception system 21 also comprises correction affirmation means 23 for correcting and affirming the content of the item of the order information C stored in the database 22, based on correction affirmation information H and affirmation information transmitted from the laboratory 3 which will be explained later. In the printing order reception system 21, a bill issuing system 6 for issuing a bill to the user or to the agency at which the user receives the prints comprises data generating means 24 for generating bill data D necessary for issuing the bill. The bill issuing system 6 is connected to the printing order reception system 21 via a network 5.

The laboratory 3 is a system for carrying out printing. The laboratory 3 comprises a database 31 for storing the image data S transferred from the order reception site 2, output means 32 such as a printer for printing the image data S based on the item of the order information C, a database 33 for storing the item of the order information C, correction affirmation means 34 for generating the correction affirmation information H for affirming the content of the item of the order information C stored in the database 33 by changing the order information item in a manner which will be explained later and affirmation information for affirming the content of the item of the order information C, and for transmitting the correction affirmation information H and the affirmation information to the order reception site 2, input means 35 comprising a keyboard and a mouse for carrying out various inputs to the correction affirmation means 34, a monitor 36 for displaying information necessary for operation by an operator, and transmission means 37 comprising a network adopter or a modem for transmitting various kinds of data to the order reception site 2.

The correction affirmation means 34 corresponds to the correction means and the affirmation means of the laboratory server and the correction affirmation means 23 corresponds to the correction means of the relay server described above.

Figure 3:
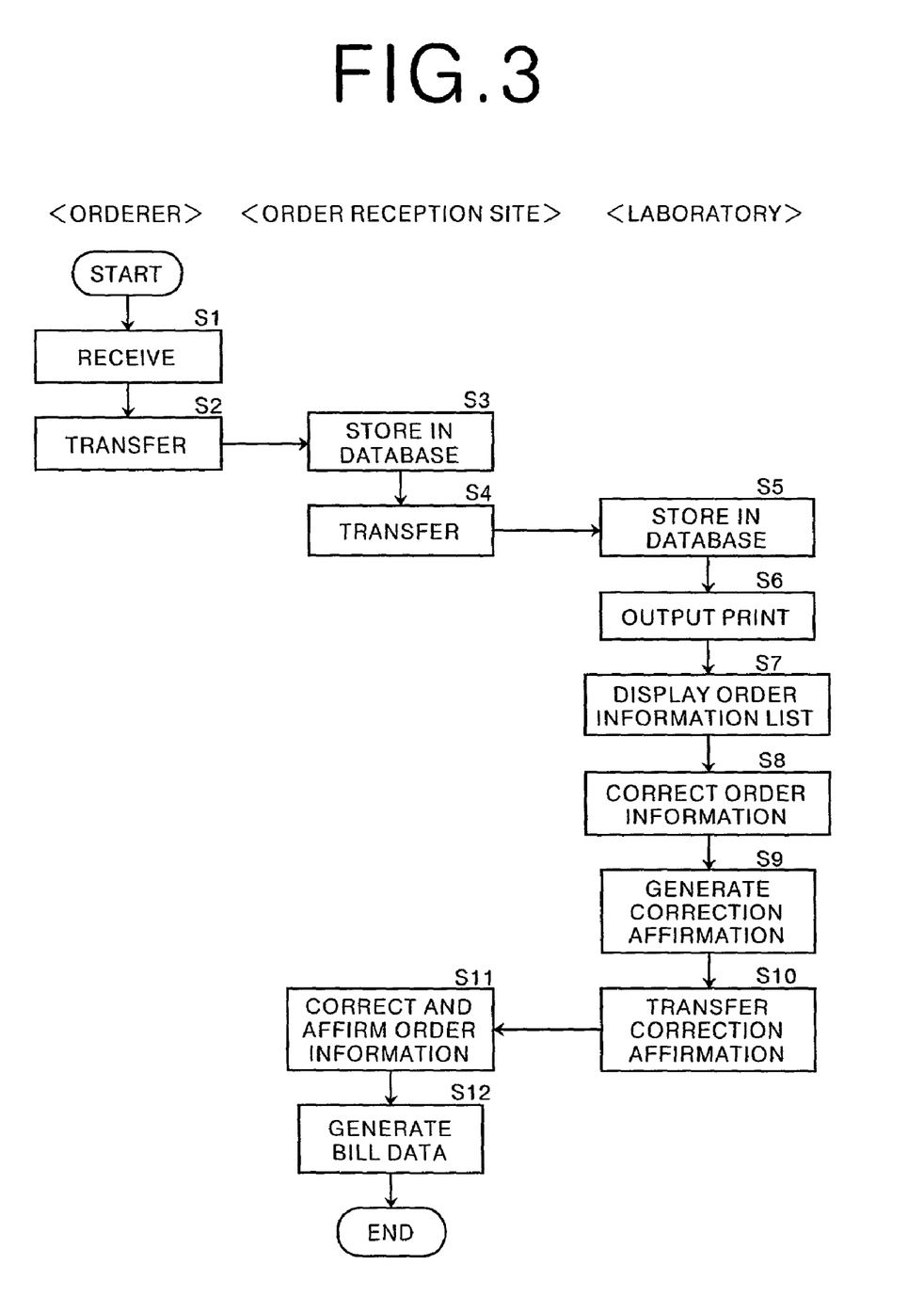
FIG. 3 is a flow chart showing operation of this embodiment.

Operation of this embodiment will be explained next. FIG. 3 is a flow chart showing the operation of this embodiment. The orderer 1 receives the image data S and the item of the order information C generated by the user (Step S1). The orderer 1 transfers the item of the information C and the image data S to the order reception site 2 (Step S2). In the order reception site 2, the item of the order information C is stored in the database 22 of the printing order reception system 21 (Step S3), and the item of the order information C and the image data S are transferred to the laboratory 3 that carries out printing (Step S4). In the laboratory 3, the image data S and the item of the order information C are stored in the databases 31 and 33, respectively (Step S5). Based on the item of the order information C, the image data S are read from the database 31 and the output means 32 outputs the prints (Step S6).

After the prints are generated in the above manner, the operator of the laboratory 3 checks the actual quantity of the prints to be provided to the user. Although the item of the order information C instructs printing, an image of damaged data, a completely white or black image, or an image which is ethically problematic is not printed, or eliminated from the prints to be provided to the user even in the case where printing has actually been carried out. Therefore, the total requested quantity of the prints described in the item of the order information C or the requested quantity for each of the image IDs may be different from the actual quantity of the prints. The operator therefore compares the total requested quantity or the requested quantity for each of the image IDs with the actual quantity, and inputs a correction instruction from the input means 35 to change the item of the order information C stored in the database 33 if the quantities do not agree. In response to the instruction, a list of order information items is displayed at Step S7 as will be explained later, and the item of the order information C is changed at Step S8. Hereinafter, this order information correction will be explained.

Figure 4:
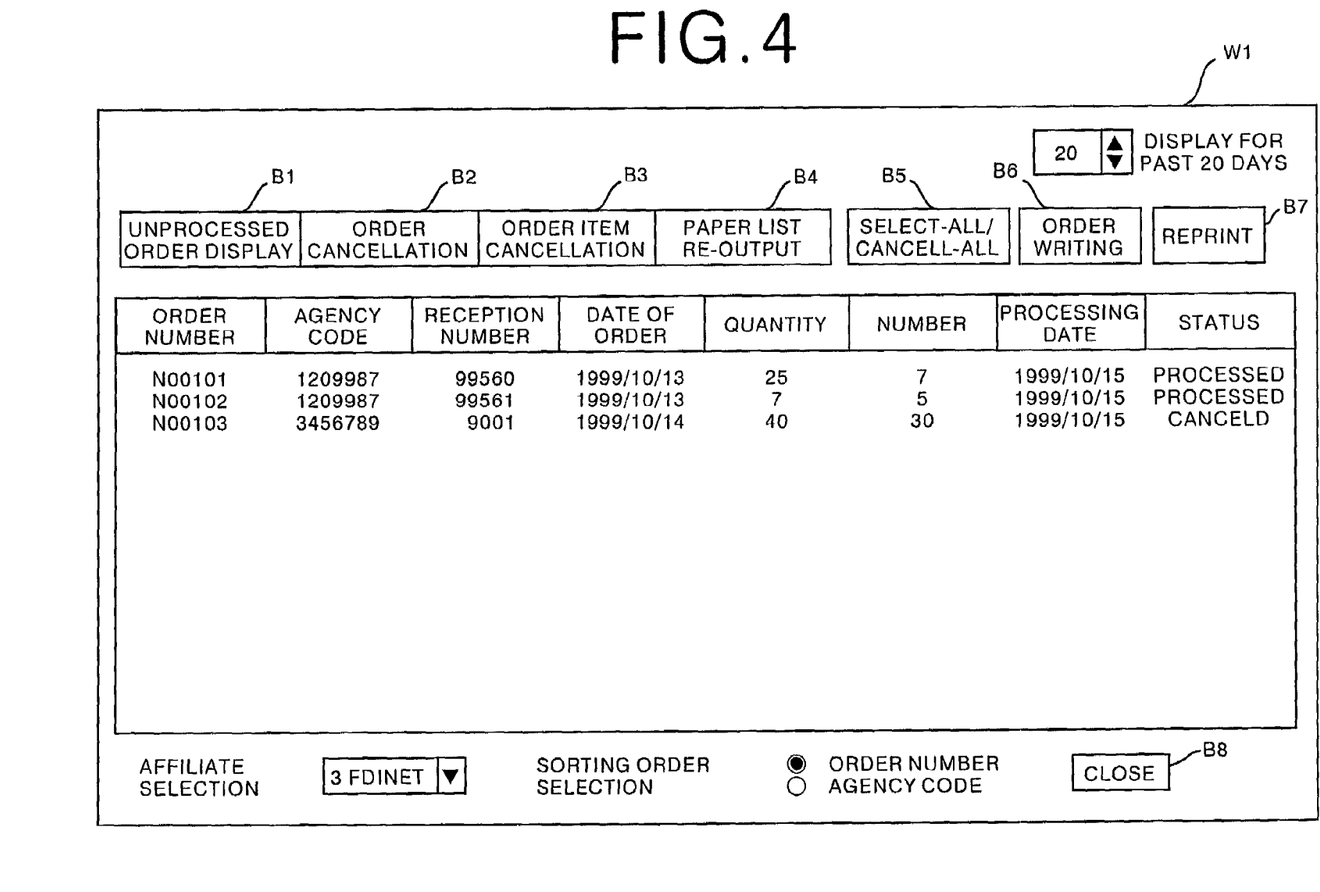
FIG. 4 shows how a list of order information C (selection window) is displayed.

The operator of the laboratory 3 displays the list of the items of the order information C stored in the database 33. FIG. 4 shows how the list of the items of the order information C is displayed. As shown in FIG. 4, an order information selection window W1 is displayed on the monitor 36. An order number, an agency code, a reception number, the date of order, the quantity, the number of images, the date of processing, and a state of the item of the order information C regarding processing completion or cancellation are displayed for each item of the order information C in the selection window W1. In an upper portion of the selection window W1, an unprocessed order display button B1 for displaying an item or items of the order information C that have not been processed, an order cancellation button B2 for canceling the item of the order information C itself, an order item cancellation button B3 for displaying a cancellation window which will be explained later for canceling an order item for each of the images included in the item of the order information C, a paper list re-output button B4 for re-outputting a paper list recording the items of the order information C, a select-all/cancel-all button B5 for selecting/canceling all the displayed items of the order information C, an order writing button B6 for outputting the item of the order information C selected from the list and the image data accompanying the order information item in an external recording medium or in a hard disc, a reprint button B7 for carrying out reprinting based on the item of the order information C, and an input box for selecting the date in order to display the items of the order information C according to the date are displayed. In a lower portion of the selection window W1, a pull-down menu for selecting an affiliate, a check box for selecting sorting order, and a close button B8 for closing the selection window W1 are displayed. In the explanation below, the order ID added to the item of the order information C corresponds to the order number.

Figure 5:
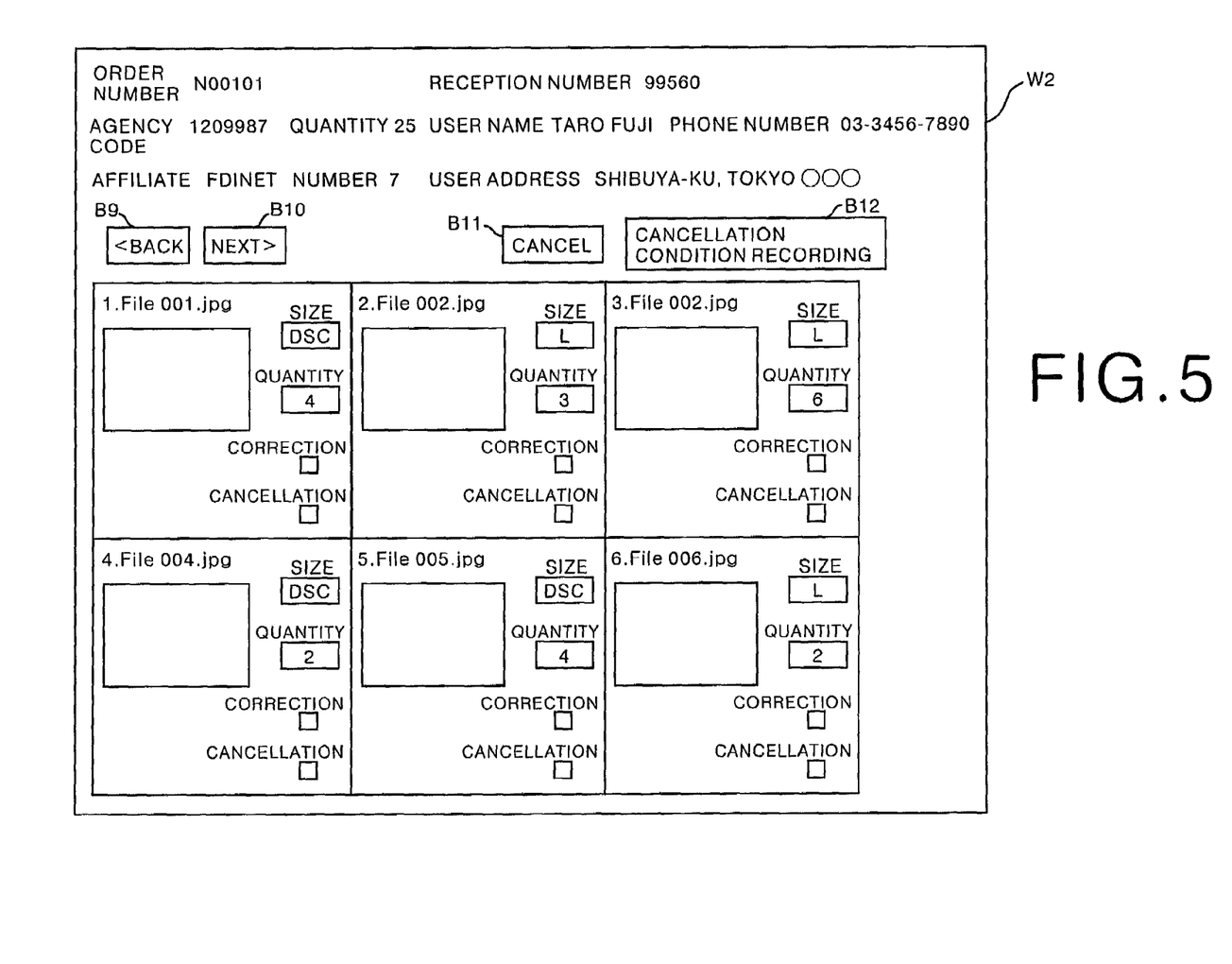
FIG. 5 shows a cancellation window.

When an operator selects the order number of the item of the order information C to be changed and pushes the order item cancellation button B3 in the selection window W1, a cancellation window W2 shown in FIG. 5 is displayed on the monitor 36. As shown in FIG. 5, the order number, the agency code, the affiliate, the ordered quantity (the total requested quantity), the number of images, the reception number, and the name, address, and phone number of the user are displayed in the cancellation window W2, regarding the item of the order information C selected in the selection window W1. Furthermore, the image file name, a thumbnail image, the print size, and the quantity included in the item of the order information C are also displayed in relation to each of the image IDs. A correction check box and a cancellation check box are also displayed in relation to each of the image IDs. Moreover, a back button B9 and a next button B10 for displaying other images not being displayed in the cancellation window W2, a cancel button B11 for canceling cancellation, and a cancellation condition recording button B12 for storing a cancellation condition are displayed.

The operator refers to the actual quantity of the prints and changes the quantity for each of the image IDs of the prints whose quantity has been changed. For example, if no printing is carried out or no prints are provided to the user for one of the image IDs, the operator turns on the cancellation box corresponding to the image ID. If color correction is carried out for one of the image IDs, the operator turns on the correction box for the image ID. Thereafter, by clicking the cancellation condition recording button B12, the item of the order information C stored in the database 33 is changed.

Figure 6:
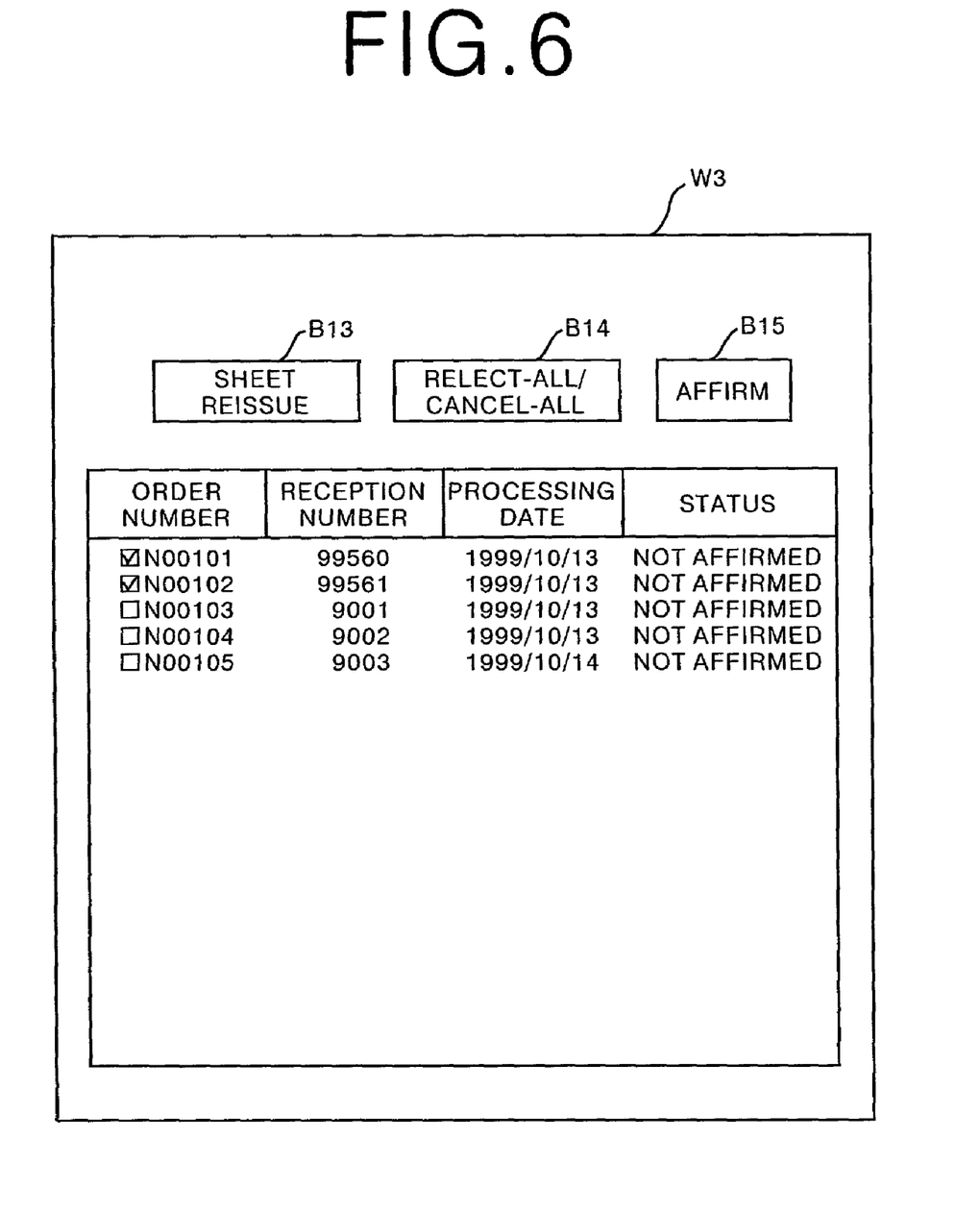
FIG. 6 shows an order information correction affirmation window.

A correction affirmation window for the items of the order information C is then displayed on the monitor 36. FIG. 6 shows the correction affirmation window for the items of the order information C. As shown in FIG. 6, a list of the order number, the reception number, the processing date, and a status of the order information affirmation are displayed for each item of the order information C in a correction affirmation window W3. In this list, check boxes are also shown corresponding to the order numbers. In an upper portion of the correction affirmation window W3, a sheet reissue button B13 for reissuing an order management list (a list of the items of the order information C grouped according to delivery) used at the time of inspecting the prints, a select-all/cancel-all button B14 for selecting/canceling all the displayed items of the order information C, and an affirm button B15 for affirming correction are displayed. When the correction affirmation window W3 is displayed, the check boxes are not turned on. By turning one of the check boxes on and pushing the affirm button B15, only the content of the item of the order information C having the check box being ON is affirmed, and the correction affirmation information H is generated (Step S9). For an item of the order information C whose content has not been changed but has the check box being ON, the affirmation information for affirming the content thereof is generated. The content of the item of the order information C stored in the database 33 is affirmed by describing the affirmation in a header of the order information item or by turning on a flag indicating the affirmation.

Figure 7:
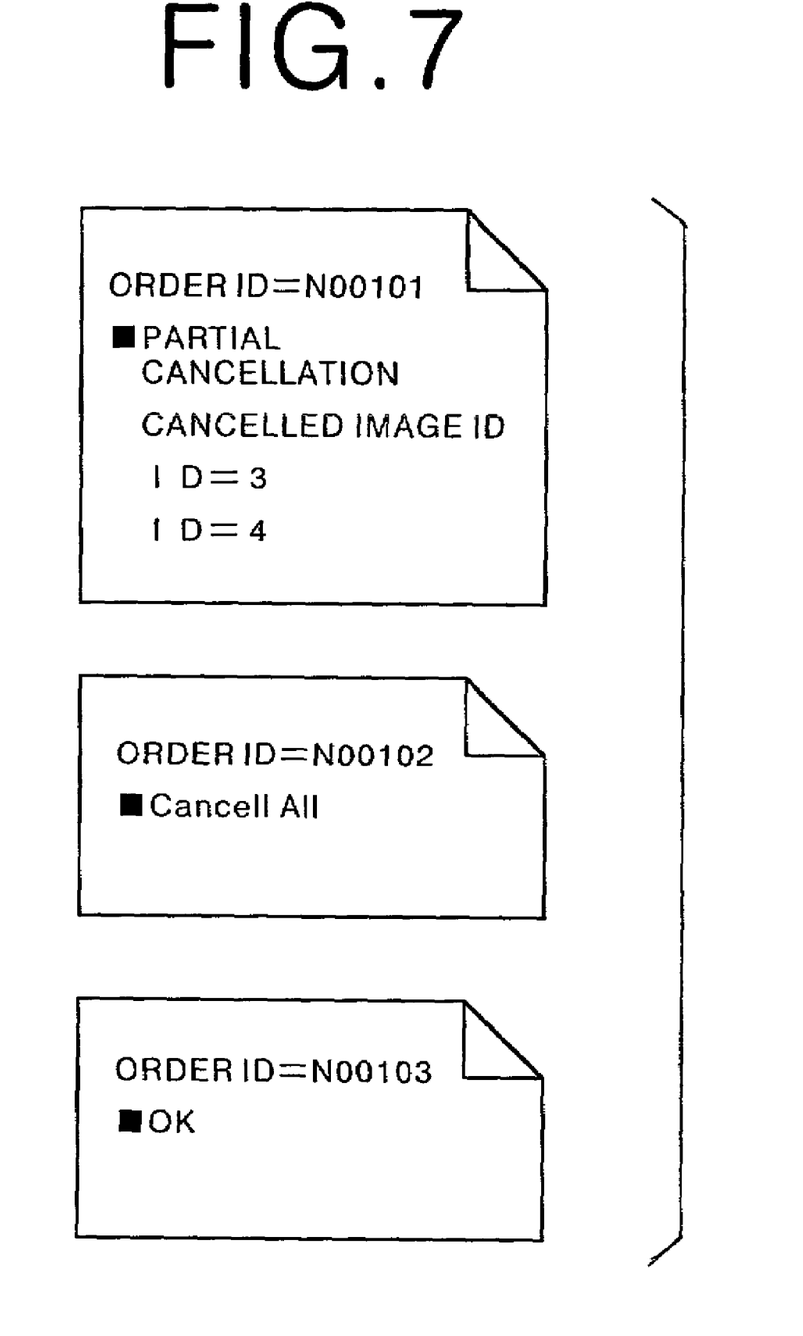
FIG. 7 shows correction affirmation information.

FIG. 7 shows the correction affirmation information H and the affirmation information. The correction affirmation information H describes the order ID regarding the item of the order information C whose correction has been affirmed. For the image whose prints have not been printed or are not provided to the user, the image ID thereof is also described in the correction affirmation information H. If the requested quantity is different from the actual quantity for an image whose printing has been carried out and whose prints are provided to the user, the image ID and the actual quantity of the image are also described. In the case where no printing has been carried out or no prints are provided for all images described in one item of the order information C, "Cancel all" is described therefor. In the case where printing has been carried out and all prints are provided to the user for all images described in one of the items of the order information C, "OK" is described in the affirmation information, as shown in FIG. 7.

The correction affirmation information H and the affirmation information generated in the above manner are transferred to the order reception site 2. (Step S10). In the printing order reception system 21 of the order reception site 2, the correction affirmation means 23 receives the correction affirmation information H and the affirmation information, and changes and affirms the corresponding item of the order information C stored in the database 22, based on the order ID described therein (Step S11). For the item of the order information C whose ID is described in the affirmation information, only the content of the order information is affirmed. The content of the item of the order information C stored in the database 22 is affirmed by describing the affirmation in a header thereof or by turning on a flag indicating the affirmation.

Based on the item of the order information C whose content has been affirmed, the data generating means 24 generates bill data D necessary for issuing a bill from the bill issuing system 6 (Step S12). The bill data D are transferred to the bill issuing system 6 and the bill is generated by the system 6 to end the procedure.

In a conventional system, an operator of a laboratory manually checks the quantity by referring to order information that has been printed, and a result of this a check is sent to a bill issuing system. In the bill issuing system, a bill is issued manually by referring to the order information written manually. Therefore, the operation is time-consuming. However, in this embodiment, the bill issuing system 6 accesses the database 22 of the printing order reception system 21 and receives the bill data D via the network 5. In this manner, the bill describing a fee corresponding to the actual quantity can be generated. As a result, the bill issuing system 6 becomes more convenient and an efficient printing service can be provided.

In the above embodiment, the correction affirmation means 34 changes the content of the item of the order information C and generates the correction affirmation information H for affirming the content. However, only correction information changing the content of item of the order information C may be generated. The content of the correction information is practically the same as in the correction affirmation information H shown in FIG. 7. In this case, only the content of the item of the order information C stored in the databases 33 and 22 of the laboratory 3 and the printing order reception system 21 is corrected, based on the correction information. After a predetermined time has elapsed since this correction, the content of the item of the information C is then affirmed, assuming no further correction. Alternatively, the content of the item of the order information C stored in the databases 22 and 33 may be changed by the correction information. In this case, the affirmation information is generated by the correction affirmation means 34 after the predetermined time has elapsed, and the content of the item of the order information C is affirmed based on the affirmation information.

In the above embodiment, the orderer 1 may have a database for storing the item of the order information C.

Figure 8:
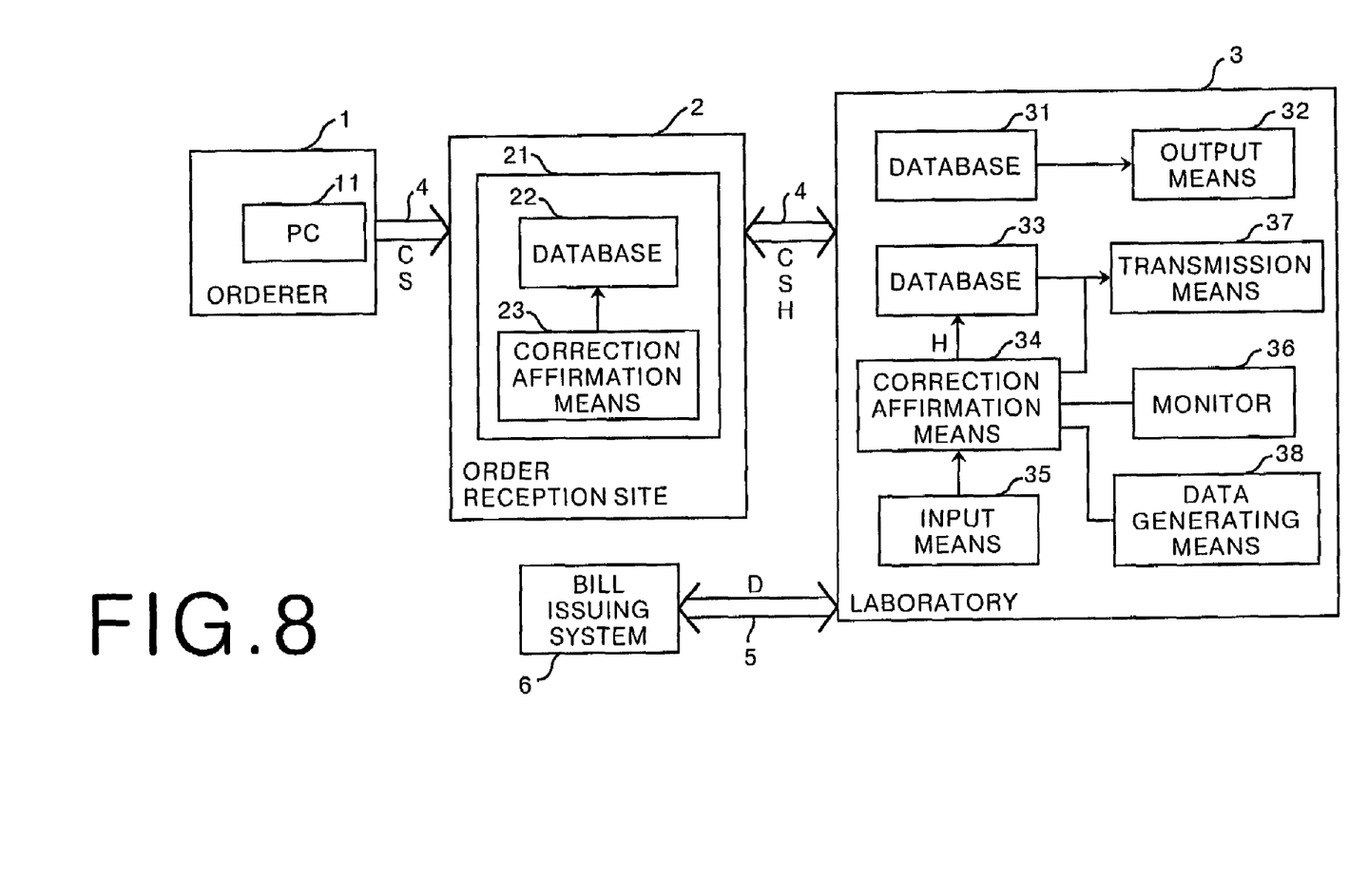
FIG. 8 is a block diagram showing a configuration of another embodiment of the printing system of the present invention.

In the above embodiment, the order reception site 2 has the data generating means 24 to generate the bill data D, and the bill issuing system 6 receives the bill data D by accessing the order reception site 2. However, as shown in FIG. 8, the laboratory 3 may comprise data generating means 38 for generating the bill data D so that the bill issuing system 6 can obtain the bill data D by accessing the laboratory 3. Alternatively, both the order reception site 2 and the laboratory 3 may have the data generating means 24 and 38, respectively.

Figure 9:
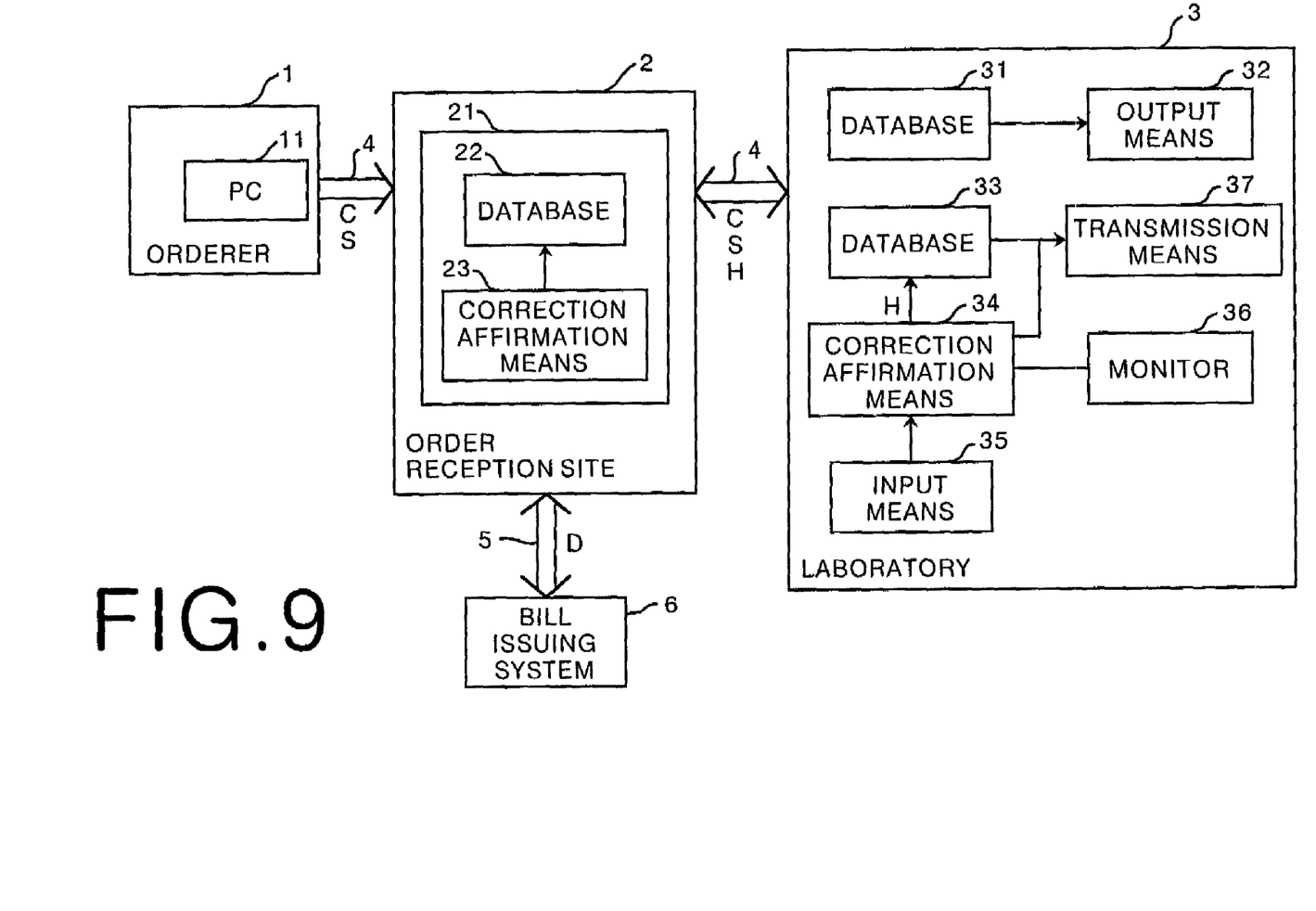
FIG. 9 is block diagram showing a configuration of still another embodiment of the printing system of the present invention.

In the above embodiment, the bill issuing system 6 receives the bill data D from the data generating means 24 of the order reception site 2. However, as shown in FIG. 9, the bill issuing system 6 may affirm the content of the item of the order information C by accessing the database 22 of the order reception site 2, without the data generating means 24 of the order reception site 2. In this case, the bill issuing system 6 affirms the content of the item of the order information C and generates the bill based on the content. Furthermore, in this case, the bill issuing system 6 may affirm the content of the item of the order information C by accessing the database 33 of the laboratory 3. Alternatively, the bill issuing system 6 may affirm the content of the item of the order information C by accessing both the order reception site 2 and the laboratory 3.

In the above embodiment, the present invention is applied so that the bill issuing system 6 can issue the bill efficiently. However, in the case where a DPE store at which the user receives the prints issues the bill, the DPE store can efficiently issue the bill and affirm the quantity of the prints by receiving the bill data D from the order reception site 2 or from the laboratory 3.

Furthermore, the present invention can be applied to the case of writing the image data S in a CD-R, although the case of printing the image data S has been explained in the above embodiment.

In the above embodiment, the item of the order information C and the image data S are transferred from the order reception site 2 to the laboratory 3. However, an order reception center existing between the order reception site 2 and the laboratory 3 may be used for receiving an item of the order information C and the image data S from the order reception site 2 and for assigning the item of the order information to the laboratory 3. In this case, the order reception center has a database for storing the item of the order information C. When the correction affirmation information H is transferred from the laboratory 3, the order reception site 2 storing the item of the order information C is found and the correction affirmation information H is transferred to the order reception site 2.

Furthermore, a plurality of systems such as a site, a laboratory, and a center may be used between the orderer 1 and the laboratory 3, or between the user and the laboratory 3. In this case, a database for storing the item of the order information C is used in the order reception center, in the site, or in the laboratory so that the actual quantity can be affirmed by correcting the content of the item of the order information according to the actual quantity and by referring to the item of the order information C stored in any one of the databases in the sites or laboratories.

What is claimed is:

1. A printing system comprising a laboratory server for obtaining prints by carrying out printing of an image based on order information provided from a user for instructing printing of the image, the laboratory server having a laboratory database for storing the order information including information representing at least an image ID specifying the image to be printed and a requested quantity of the prints and added with an order ID for identifying the image ID and the requested quantity, and the laboratory server comprising correction means for changing the requested quantity of the prints in the order information stored in the laboratory database to an actual quantity of the prints based on an input received by the correction means.

2. A printing system as defined in claim 1, wherein the correction means changes the requested quantity to the actual quantity based on reception of specification of the order ID and correction of the requested quantity to the actual quantity regarding the image ID included in the specified order ID.

3. A printing system as defined in claim 1, wherein the laboratory server further comprises affirmation means for affirming, in the case where the actual quantity of the prints has been affirmed, the content of the order information stored in the laboratory database, based on the order ID including the image ID of the prints whose quantity has been affirmed.

4. A printing system as defined in any one of claims 1 to 3, the printing system further comprising a relay server having a database for storing the order information provided by the user, the relay server transferring the order information to the laboratory server via a network, the laboratory server further comprising transmission means for generating correction information in relation to the order ID added to the order information for changing the requested quantity in the order information to the actual quantity of the prints and for transmitting the correction information to the relay server, and the relay server comprising correction means for changing the requested quantity of the order information having the order ID related to the correction information out of the order information stored in the database thereof to the actual quantity of the prints, based on the correction information transmitted thereto.

5. A printing system as defined in claim 4, the transmission means generating affirmation information indicating affirmation of the actual quantity of the prints in relation to the order ID added to the order information including the image ID of the prints whose actual quantity has been affirmed and transmitting the affirmation information to the relay server, and the correction means in the relay server affirming the content of the order information having the order ID related to the affirmation information out of the order information stored in the database thereof, based on the affirmation information transmitted thereto.

6. A printing system as defined in any one of claims 1 to 3, wherein the laboratory server further comprises data generating means for generating bill data for issuing a bill by referring to the order information stored in the laboratory database.

7. A printing system as defined in claim 4, wherein the laboratory server and/or the relay server further comprise data generating means for generating bill data for issuing a bill by referring to the order information stored in the laboratory database and/or the database of the relay server.

8. A printing system as defined in claim 6, further comprising a bill issuing system for generating a bill based on the bill data.

9. A printing system as defined in any one of claims 1 to 3, further comprising a system for issuing a bill by referring to the order information stored in the laboratory database.

10. A printing system as defined in claim 4, further comprising a system for issuing a bill by referring to the order information stored in the laboratory database and/or in the database of the relay server.

11. A printing system comprising:
a laboratory server for obtaining prints by carrying out printing of an image based on order information provided from a user for instructing printing of the image, the laboratory server having a laboratory database for storing the order information including an order ID specifying the order information, an image ID specifying the image to be printed and a requested quantity of the prints of the specified image to be printed,
wherein the laboratory server includes correction means for changing the requested quantity of the prints in the order information stored in the laboratory database to an actual quantity of the prints to be provided to the user when the actual quantity of the prints is to be different from the requested quantity specified in the order information so that a bill describing a fee corresponding not to the requested quantity but to the actual quantity can be generated thereby.

12. A printing system comprising:
a laboratory server for obtaining prints by carrying out printing of an image based on order information provided from a user for instructing printing of the image, the laboratory server including:
means for receiving order information from the user for instructing printing of the image, the order information including an order ID specifying the order information, an image ID specifying the image to be printed and a requested quantity of prints of the specified image to be printed;
a laboratory database for storing the order information;
means for inputting an actual quantity of prints to be provided to the user; and
correction means for changing the requested quantity of the prints in the order information stored in the laboratory database to the actual quantity of the prints to be provided to the user when the actual quantity of the prints is different from the requested quantity of the prints;
whereby a bill describing a fee corresponding to the actual quantity of the prints can be generated.

13. The printing system of claim 11 wherein said order information is received over a network from a computer of the user.

14. The printing system of claim 12 wherein said order information is received over a network from a computer of the user.

15. The printing system of claim 13 wherein the image is printed based on the order information provided by the user.

16. The printing system of claim 14 wherein the image is printed based on the order information provided by the user.

17. The printing system of claim 15, wherein image data representing the image is stored on the laboratory server and wherein the print is produced by using said image data.

18. The printing system of claim 16, wherein image data representing the image is stored on the laboratory server and wherein the print is produced by using said image data.

19. The printing system of claim 15 further comprising a relay server connected to a network for receiving and processing the order information from the user and transferring the order information to the laboratory server.

20. The printing system of claim 16 further comprising a relay server connected to a network for receiving and processing the order information from the user and transferring the order information to the laboratory server.

21. The printing system of claim 15 further including data generating means for generating a bill based on the order information and the actual number of prints.

22. The printing system of claim 16 further including data generating means for generating a bill based on the order information and the actual number of prints.

23. The printing system of claim 19 wherein said relay server receives correction information from the laboratory server and includes data generating means for generating bill generation data based on the order information and the correction information.

24. The printing system of claim 20 wherein said relay server receives correction information from the laboratory server and includes data generating means for generating bill generation data based on the order information and the correction information.

25. The printing system of claim 11 wherein said correction means for changing the requested quantity of the prints in the order information stored in the laboratory database to an actual quantity of the prints to be provided to the user comprises means for sending a cancellation instruction with respect to an image ID of a given image to change the requested quantity of prints of the given image to zero.

26. The printing system of claim 12 wherein said correction means for changing the requested quantity of the prints in the order information stored in the laboratory database to an actual quantity of the prints to be provided to the user comprises means for sending a cancellation instruction with respect to an image ID of a given image to change the requested quantity of prints of the given image to zero.

27. The printing system of claim 11 wherein the correction means for changing the requested quantity of the prints in the order information stored in the laboratory database to the actual quantity of the prints to be provided to the user when the actual quantity of the prints is different from the requested quantity of the prints changes the requested quantity of prints based on an input received by the correction means.

* * * * *